United States Patent
Prasad et al.

[11] Patent Number: 5,935,298
[45] Date of Patent: Aug. 10, 1999

[54] SOLID ELECTROLYTE IONIC CONDUCTOR OXYGEN PRODUCTION WITH STEAM PURGE

[75] Inventors: Ravi Prasad, East Amherst; Christian Friedrich Gottzmann, Clarence, both of N.Y.

[73] Assignee: Praxair Technology, Inc., Danbury, Conn.

[21] Appl. No.: 08/972,410

[22] Filed: Nov. 18, 1997

[51] Int. Cl.$^6$ .................. B01D 53/22; B01D 53/047; B01D 53/26

[52] U.S. Cl. .................. 95/39; 95/52; 95/54; 95/96; 95/117; 95/288

[58] Field of Search .................. 95/39, 45, 54, 95/96, 115, 117, 288, 52

[56] References Cited

U.S. PATENT DOCUMENTS

| | | | |
|---|---|---|---|
| Re. 34,595 | 5/1994 | Chen et al. | 95/54 |
| 5,035,726 | 7/1991 | Chen et al. | 95/54 |
| 5,160,713 | 11/1992 | Mazanec et al. | 423/210 |
| 5,205,842 | 4/1993 | Prasad | 95/54 X |
| 5,306,411 | 4/1994 | Mazanec et al. | 204/265 |
| 5,354,547 | 10/1994 | Rao et al. | 95/45 X |
| 5,435,836 | 7/1995 | Anand et al. | 95/45 |
| 5,447,555 | 9/1995 | Yee et al. | 95/54 |
| 5,547,494 | 8/1996 | Prasad et al. | 95/54 |
| 5,562,754 | 10/1996 | Kang et al. | 95/54 |
| 5,565,017 | 10/1996 | Kang et al. | 95/54 |
| 5,584,194 | 12/1996 | Gardner | 95/54 X |
| 5,611,842 | 3/1997 | Friesen et al. | 95/45 X |
| 5,733,435 | 3/1998 | Prasad et al. | 95/54 X |
| 5,753,007 | 5/1998 | Russek et al. | 95/54 X |
| 5,753,010 | 5/1998 | Sircar et al. | 95/45 |

FOREIGN PATENT DOCUMENTS

| | | |
|---|---|---|
| 0743088 | 11/1996 | European Pat. Off. . |
| 0778069 | 6/1997 | European Pat. Off. . |
| 2257054 | 1/1993 | United Kingdom ........ 95/54 |

*Primary Examiner*—Robert Spitzer
*Attorney, Agent, or Firm*—Bharat C. Ganhi

[57] ABSTRACT

A process for producing a pressurized oxygen stream by compressing and heating a feed gas stream containing elemental oxygen, and separating the heated feed gas stream using an ion transport module into an oxygen-depleted gas stream on the retentate side and an oxygen-containing gas stream on a permeate side. The permeate side of the ion transport membrane is purged using a gas stream containing steam to produce a pressurized gas stream containing oxygen and steam, and the gas stream is separated into the pressurized oxygen stream saturated with water vapor and a residual water stream.

17 Claims, 2 Drawing Sheets

SOLID ELECTROLYTE IONIC CONDUCTOR OXYGEN PRODUCTION WITH STEAM PURGE

FIELD OF THE INVENTION

The invention relates to the use of solid electrolyte ionic conductor systems in gas separating systems. In particular, the invention relates to employing pressurized steam to purge the permeate side of the solid electrolyte ionic conducting membranes to enhance the efficiency of the process and produce an oxygen and steam gas stream which can be readily separated to obtain a pure oxygen product.

BACKGROUND OF THE INVENTION

Non-cryogenic bulk oxygen separation systems, for example, organic polymer membrane systems, have been used to separate selected gases from air and other gas mixtures. Air is a mixture of gases which may contain varying amounts of water vapor and, at sea level, has the following approximate composition by volume: oxygen (20.9%), nitrogen (78%), argon (0.94%), with the balance consisting of other trace gases. An entirely different type of membrane, however, can be made from certain inorganic oxides. These solid electrolyte membranes are made from inorganic oxides, typified by calcium- or yttrium-stabilized zirconium and analogous oxides having a fluorite or perovskite structure.

Although the potential for these oxide ceramic materials as gas separation membranes is great, there are certain problems in their use. The most obvious difficulty is that all of the known oxide ceramic materials exhibit appreciable oxygen ion conductivity only at elevated temperatures. They usually must be operated well above 500° C., generally in the 600° C. to 900° C. range. This limitation remains despite much research to find materials that work well at lower temperatures. Solid electrolyte ionic conductor technology is described in more detail in Prasad et al., U.S. Pat. No. 5,547,494, entitled *Staged Electrolyte Membrane,* which is hereby incorporated by reference to more fully describe the state of the art.

It is relatively easy to use the basic ion transport separation process to remove nearly all of the oxygen from the feed gas stream to produce a nitrogen product gas stream, particularly if the permeate side of the ion transport membrane can be purged with an oxygen-free stream. It is, however, more difficult to efficiently recover oxygen as the product using this basic process. For example, if pure oxygen is withdrawn from the permeate gas stream at atmospheric pressure, the feed gas stream must be at a pressure well in excess of 5 atmospheres in order to continue to drive oxygen through the ion transport membrane. Thus, most of the compression energy is lost in the retentate gas stream or nitrogen waste stream unless that gas stream represents a product which is required at pressure.

Another alternate process involves vacuum pumping of the permeate side of the ion transport membrane in order to maintain the driving force for the permeation process without contaminating the oxygen product gas stream. However, there is a considerable cost to operating the vacuum pumps.

Advances in the state of the art of air separation using solid electrolyte ionic conductors have been presented in the technical literature. U.S. Pat. No. 5,306,411 (Mazanec et al.) discusses mixing an inert diluent such as steam with a light hydrocarbon feed gas to produce synthesis gas or unsaturated hydrocarbons as a permeate effluent from the anode side of an ion transport membrane. An oxygen-containing gas is passed through a retentate or cathode side of the membrane; the resulting oxygen-depleted gas withdrawn from the retentate zone apparently is discarded. Mazanec at al. further disclose in U.S. Pat. No. 5,160,713 that steam can be generated in the permeate zone by reaction between hydrogen, introduced as an oxygen-consuming substrate, and oxygen transported through the membrane.

U.S. Pat. No. 5,565,017 (Kang et al.) relates to a system integrating an ion transport membrane with a gas turbine to recover energy from the retentate gas stream after it is heated and steam is added. U.S. Pat. No. 5,562,754 (Kang et al.) states that the permeate side of the ion transport membrane may be swept with steam. A stream of oxygen-containing gas is heated in a direct-fired combustor, passed through the retentate zone of the ion transport membrane, and then directed to a gas turbine to generate power. This non-permeate stream is then discarded as exhaust.

OBJECTS OF THE INVENTION

It is therefore an object of the invention to efficiently recover oxygen without the need for a high pressure feed gas stream by employing a steam purge stream for the permeate or anode side of the ion transport membrane of an ion transport separator module and to optionally produce nitrogen on the retentate side of the ion transport membrane.

It is a further object of the invention to recover oxygen at an elevated pressure without the need for an oxygen compressor by providing the steam purge stream at elevated pressure and condensing out the water from the resulting elevated pressure permeate gas stream.

It is another object of the invention to enable use of low level waste heat as an energy source for raising the temperature of the steam purge stream.

It is yet another object of the invention, in cases where no waste heat is available, to utilize the heat of condensation of the water in the permeate gas stream as the energy source by raising the pressure and therefore the condensing temperature of the permeate gas stream moderately above that of the boiling purge stream.

SUMMARY OF THE INVENTION

This invention comprises a process for producing at least a pressurized gas stream containing oxygen and steam from a feed gas stream which contains elemental oxygen. In the process, the feed gas stream is compressed and the compressed feed gas stream is then heated. The heated feed gas stream is separated using an ion transport module including an ion transport membrane having a permeate side and a retentate side into an oxygen-depleted gas stream on the retentate side and an oxygen-containing gas stream on the permeate side, and the permeate side of the ion transport membrane is purged using a gas stream containing steam at a pressure preferably from about 30 psia to about 500 psia, more preferably 40 to 250 psia, to produce the pressurized gas stream containing oxygen and steam In a preferred embodiment of the invention, the gas stream containing oxygen and steam is separated into an oxygen product gas stream saturated with water vapor and a residual water stream by condensing out the water. In some preferred embodiments, separation of the residual water stream includes condensing at least a portion of the water contained in the gas stream containing oxygen and steam during heat exchange with another fluid stream, and the gas stream containing oxygen and steam is cooled to near its dew point and then compressed before the steam therein condenses, and the gas stream containing oxygen and steam undergoes heat exchange with a water and/or water vapor stream, which becomes the gas stream containing steam. The phrase "near its dew point" preferably refers to within 50° C., and more preferably to within 30° C., of the dew point of the steam in the gas stream containing oxygen and steam. The compressed feed gas stream is at a pressure between about 1 atm and about 5 atm, more preferably between about 1.5 atm and about 3 atm. In another preferred embodiment of the invention, a water stream is heated using thermal energy from an external process to generate the gas stream containing steam, and the pressurized oxygen product gas stream is directed to the external process for use therein. An oxygen product gas stream is separated from the oxygen product gas stream saturated with water vapor using a polymeric membrane drier system or a pressure swing and/or temperature swing adsorption drier system. In yet another preferred embodiment of the invention, the gas stream containing oxygen and steam undergoes heat exchange with a water stream or a water vapor gas stream to superheat the gas stream containing steam used to purge the permeate side of the ion transport membrane. In still another preferred embodiment of the invention, a low level waste heat stream undergoes heat exchange with a water stream or a water vapor gas stream to generate the gas stream containing steam used to purge the permeate side of the ion transport membrane. The gas stream containing steam used to purge the permeate side of the ion transport membrane is a high-pressure gas stream, thereby producing the gas stream containing oxygen and steam at a high pressure.

The invention also features a process for producing at least an oxygen gas stream containing steam from a feed gas stream containing elemental oxygen. The feed gas stream is compressed and the compressed feed gas stream preferably is heated using an ion transport reactor-heater. The heated feed gas stream is then separated using an ion transport module including an ion transport membrane having a permeate side and a retentate side into an oxygen-depleted gas stream on the retentate side and the oxygen gas stream on the permeate side, and the permeate side of the ion transport membrane is purged using a gas stream containing steam to produce the gas stream containing oxygen and steam.

BRIEF DESCRIPTION OF THE DRAWINGS

Other objects, features and advantages of the invention will occur to those skilled in the art from the following description of preferred embodiments of the invention and the accompanying drawings, in which.

DETAILED DESCRIPTION OF THE INVENTION

This invention may be accomplished by purging the permeate side of the ion transport membrane using pressurized superheated steam. With an adequate flow of steam, the partial pressure of oxygen in the permeate gas stream can be reduced to a low value, thus permitting oxygen permeation to occur when the feed gas stream is at low pressure, for example, even close to atmospheric pressure. By cooling the permeate gas stream, the water therein can be condensed and recycled, leaving the residual oxygen to be recovered or used directly. This cooled oxygen gas stream will contain some residual water vapor but is otherwise pure. It can be used directly as the product, or it can be dried further, for example, in a polymeric membrane or pressure swing adsorption (PSA) and/or temperature swing adsorption (TSA) postpurifier. The oxygen product gas stream will be at the pressure of the superheated steam, which can be adjusted to be at a low or high level, depending on the product needs. If the steam purge is at higher pressure, which is easy to obtain by pumping the feed water stream, it is possible to recover oxygen at an elevated pressure by simply condensing out the water in the permeate gas stream. Nitrogen preferably is obtained as the product or coproduct at a moderate or high pressure level.

Because the generation of steam is energy intensive, it is important to structure the process to enable the utilization of low level waste heat, if available. Alternatively, heat is recovered from the condensing water in the permeate stream by raising the pressure of that stream moderately, thereby raising its condensing temperature above the boiling temperature of the feed water stream. Preferably, the permeate stream is cooled to near its dew point and then compressed before the steam therein condenses, and the permeate stream undergoes heat exchange with a water stream or a water vapor stream, which becomes the steam stream utilized to purge the permeate side of the membrane.

As noted above, the ion transport membrane will transport oxygen when there is a difference in oxygen partial pressure across it. In comparison to polymeric membranes, ion transport membranes have a higher flux and an infinite separation factor for oxygen with respect to nitrogen. The type of ion transport module used in the invention is a 4-port device, preferably operated with a countercurrent flow pattern, that is, the purge stream enters on the permeate side of the ion transport membrane in a flow against that of the feed gas stream. Although the process shown in FIG. 1 operates in a countercurrent flow configuration, the invention is equally applicable for other flow configurations, for example, cocurrent and crossflow configurations.

Figure 1:
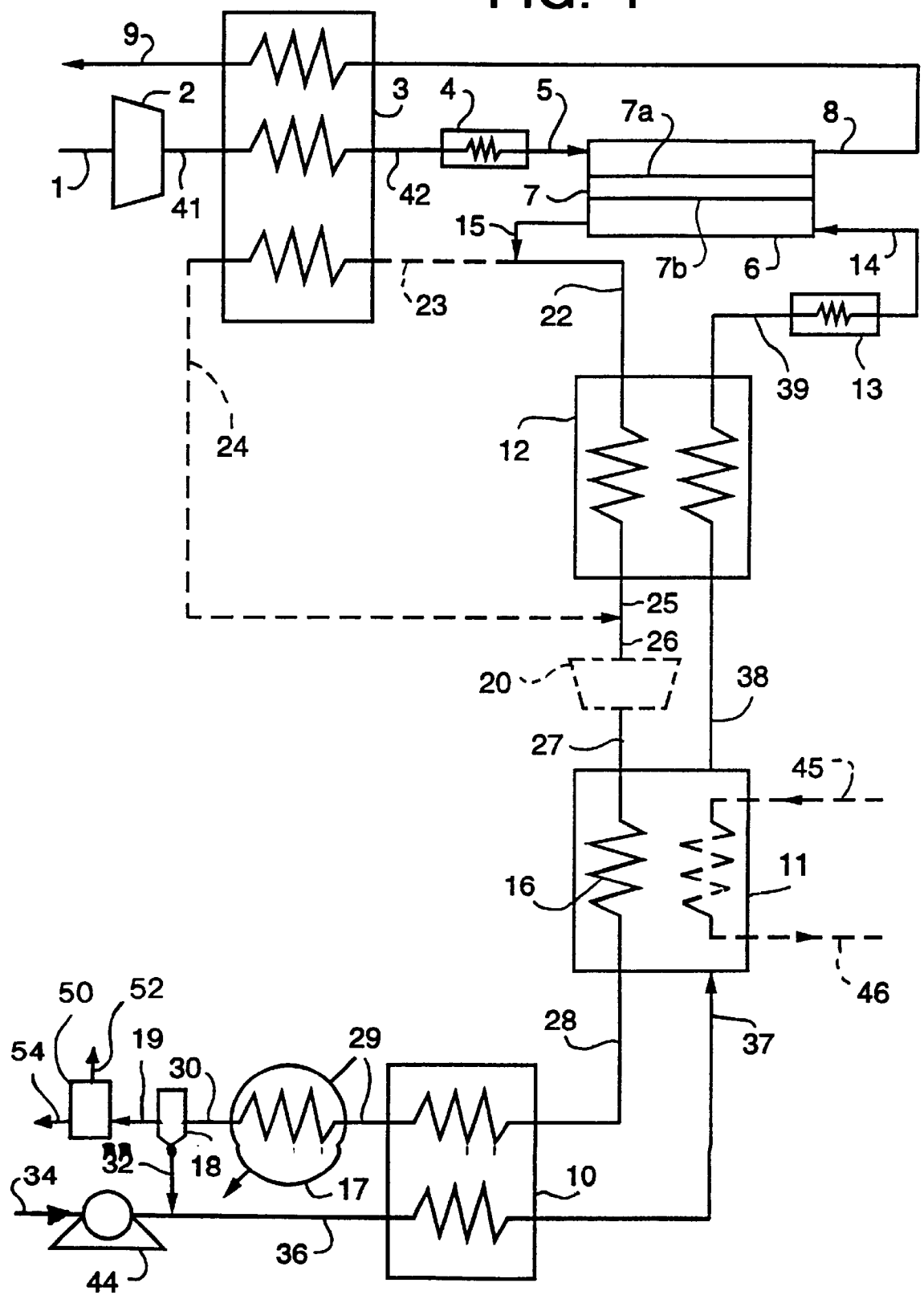
FIG. 1 is a schematic diagram showing generation and use according to the invention of a steam purge stream on the permeate side of an ion transport membrane.

An embodiment of the invention is illustrated by the schematic diagram in FIG. 1. During operation, oxygen-containing feed gas stream 1 (generally air) is compressed in compressor or blower 2 to produce compressed gas stream 41. Compressed gas stream 41 is heated against retentate gas stream 8 and optional gas stream 23 in heat exchanger 3 to produce heated gas stream 42. Cooled stream 9 is discharged from the cycle. Heated gas stream 42 is further heated in heater 4 to produce hot gas stream 5.

At the same time, recycled water stream 32 and make-up water stream 34 pumped by pump 44, are combined to obtain a pressurized water stream 36. Water stream 36 is heated in heat exchanger 10 against fluid stream 28 to obtain hot water stream 37. Hot water stream 37 is then converted to steam stream 38 in boiler-condenser 11. Optional low level waste heat stream 45, such as available from a glass or steel production process, may also be used as an energy source for raising the temperature of hot water stream 37. Stream 45, after giving up its heat, exits as waste stream 46. Steam stream 38 is then heated to a higher temperature in superheater 12 to produce superheated steam stream 39, which is further heated in heater 13 to obtain steam purge stream 14 at a pressure preferably of at least 30 psia.

When hot gas stream 5 is introduced into ion transport module 6 containing ion transport membrane 7 having a retentate side 7a and a permeate side 7b, steam purge stream 14 is used to purge the permeate side 7b of ion transport membrane 7 to produce retentate gas stream 8 and permeate gas stream 15. The presence of the purge gas reduces the oxygen partial pressure on the permeate side 7b of ion transport membrane 7, and therefore enables efficient oxygen transport even though the retentate side 7a feed gas pressure is low. Because pressurized steam purge stream 14 mixes with and dilutes the oxygen that has permeated through ion transport membrane 7, pressurized permeate stream 15 that emerges from ion transport module 6 contains both steam and oxygen at substantially the same pressure as that of stream 14. Permeate gas stream 15 is then cooled by heat exchange, either directed as gas stream 22 through superheater 12 to produce gas stream 25, or directed as optional gas stream 23 through heat exchanger 3 to produce optional gas stream 24. Gas stream 25 and/or optional gas stream 24 becomes gas stream 26 which optionally is compressed by compressor 20 to become fluid stream 27.

Compressor 20 enables fluid stream 27 to condense at a higher pressure and temperature and therefore provides heat to boil hot water stream 37 to make steam gas stream 38. Stream 27 is passed through boiler tubes 16 in boiler-condenser 11 to convert hot water stream 37 to steam, as mentioned above, and then exits as liquid-gas mixture stream 28. Liquid-gas mixture stream 28 is further cooled in heat exchanger 10 against water stream 36, as mentioned above, to obtain mixture stream 29. Mixture stream 29 is cooled in cooler-condenser 17 where most of the residual water vapor in mixture stream 29 is condensed and oxygen and water stream 30 is obtained. Recycle water stream 32 is removed in separator 18 and mixed with make-up water stream 34, as mentioned above, and residual gas stream 19 is the oxygen product. Although cooler-condenser 17 removes most of the residual water vapor in mixture stream 29, gas stream 19 is saturated with water vapor, but is otherwise pure oxygen. Residual water vapor 52 can be readily removed from the oxygen product gas stream 19 using a dryer 50 such as a polymeric membrane or adsorption system to produce a substantially dry oxygen product gas stream 54.

Gas stream 19 can be dried external to the system by conventional means, such as with a polymeric membrane drier, pressure swing adsorption (PSA) drier and/or temperature swing adsorption (TSA). For a stand-alone process, however, it may be desirable to incorporate compressor 20 to compress the permeate stream 26 slightly before it enters boiler coil 16. This permits condensation of much of the water vapor in gas stream 26 to occur in boiler-condenser 11 where it supplies heat to boil the water and make steam for the purge stream 38. This greatly enhances the thermal efficiency of the purge-permeate loop and reduces the load on the purge heater 13.

Preferably, if low level waste heat 45 is available, compressor 20 can be eliminated and the apparatus will be thereby simplified. In this case, the "free" low level waste heat can provide the energy for boiling and the heat of condensation rejected to the cooling water.

Figure 2:
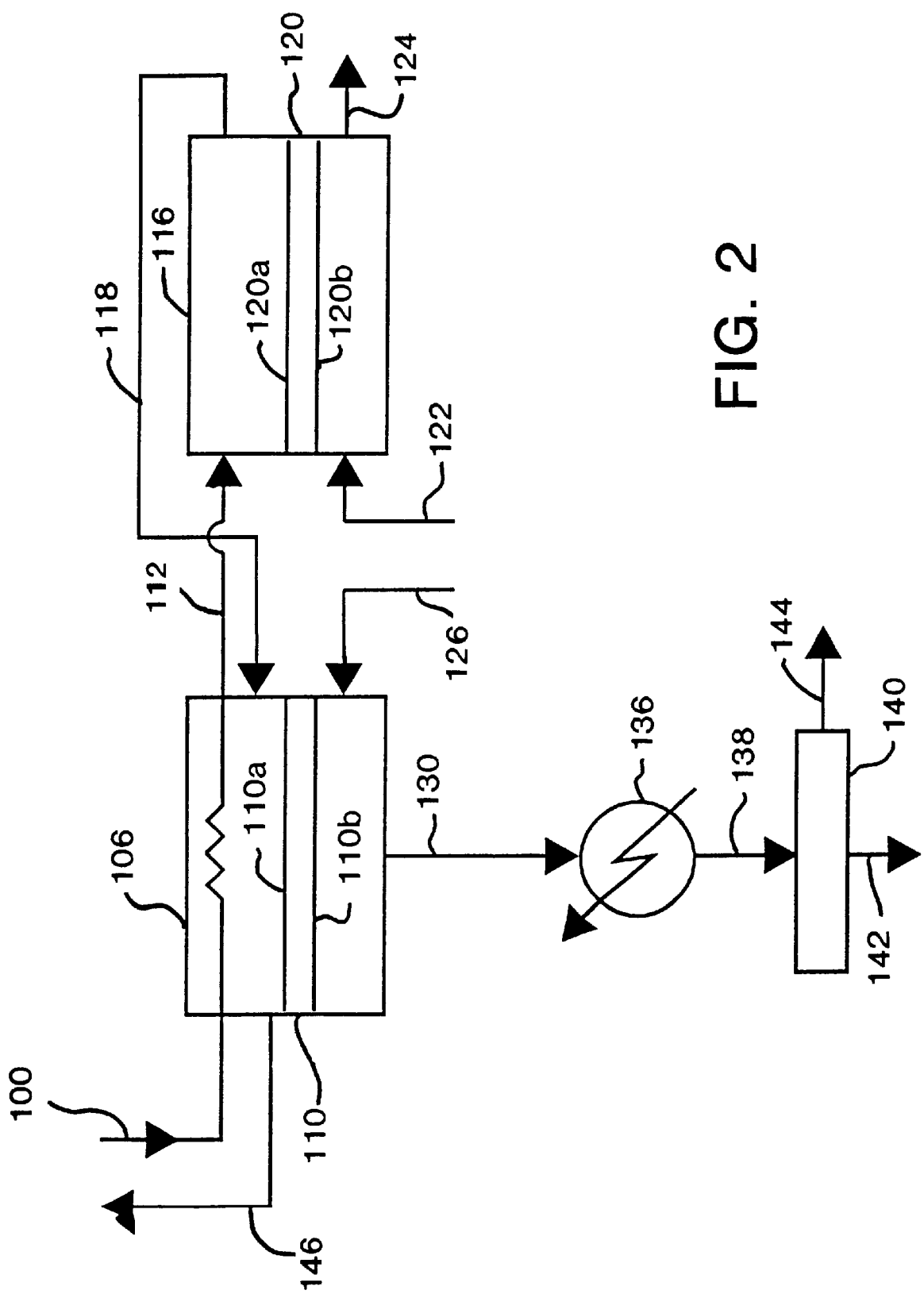
FIG. 2 is a schematic diagram showing heat input required in the process configuration being provided using an ion transport reactor-heater.

FIG. 2 is a schematic diagram showing how the heat input required, such as by heater 4, FIG. 1, in some process configurations is provided using an ion transport reactor-heater. The heat input required at several points in the process configurations may be provided using traditional or ion transport combustors, fired or electric heaters, or ion transport reactor-heaters.

During operation, feed gas stream 100 containing elemental oxygen is passed through the retentate section of reactor-heater module 106, undergoing heat exchange to become hot feed gas stream 112. Reactor-heater module 106 contains an ion transport membrane 110 having a retentate side 110a and a permeate side 110b. Hot gas stream 112 enters ion transport module 116, which contains ion transport membrane 120 having a retentate side 120a and a permeate side 120b. The permeate side 120b of ion transport membrane 120 is purged with steam gas stream 122, which may be obtained at a desired pressure from an external source, in a co-current arrangement relative to gas stream 112 in this configuration to produce first retentate gas stream 118 and permeate gas stream 124 which contains oxygen and steam.

First retentate gas stream 118 enters reactor-heater module 106, and the permeate side 110b of ion transport membrane 110 is purged with reactive gas stream 126 to produce second retentate gas stream 146 and permeate gas stream 130, which contains carbon dioxide and water vapor. Permeate gas stream 130 is cooled in cooler 136 to make gas stream 138. Gas stream 138 is passed through separator 140 to make carbon dioxide gas stream 142, which is recovered as a coproduct, and water stream 144. If the carbon dioxide is not intended to be recovered, permeate gas stream 130 may be discarded. A more detailed description of one construction of a suitable reactor-heater is disclosed in U.S. Pat. No. 5,820,655, incorporated herein by reference.

Mixed-conducting solid-oxide electrolytes are attractive for the separation of air into oxygen and nitrogen (plus argon) products. It is, however, difficult to devise practical and efficient processes, particularly for oxygen. If the product oxygen is withdrawn from the permeate stream at atmospheric pressure, the feed stream must exceed 5 atm in order to drive the oxygen through the membrane. As oxygen is removed from the high pressure stream, the pressure must be higher still to maintain the driving force. If the retentate (nitrogen) gas stream is not needed at high pressure as a product, and no energy recovery is provided for, then most of the compression energy will be lost and the process will be inefficient and will not be practical.

For the production of nitrogen alone, in the range of about 90% to substantially 100% purity, the ion transport process can be enhanced by purging the permeate side of the barrier with some of the product or with another gas stream that is oxygen-depleted or with a reactive gas that can react with the oxygen to reduce the partial pressure of oxygen on the permeate side of the ion transport membrane. None of these procedures, however, can be used when pure oxygen is recovered as a product.

The problem is to devise practical and economical processes for producing oxygen from air with mixed conducting solid oxide electrolyte membranes, even when operating at relatively low feed gas stream pressures.

Solid electrolytes have previously been mainly used in fuel cells, sensors and to prepare small quantities of pure oxygen from air, taking advantage of their infinite selectivity for oxygen transport. Electrically-driven solid electrolyte membranes have also been used for removing traces of oxygen from inert gases, applying a sufficient voltage to reduce the oxygen activity in the retentate gas stream to a very low value. Solid electrolytes have not yet been employed in the direct production of large quantities of oxygen from air.

For the production of oxygen, the most practical process previously proposed involves an integrated power generation cycle wherein a portion of the oxygen in the compressed feed air to a gas turbine is extracted using an ion transport separator. The disadvantage of this scheme is that it involves the co-production of power, and is best suited for large scale oxygen production. Another previously proposed process involves vacuum pumping of the permeate side of the ion transport membrane in order to maintain the driving force for the permeation process. The disadvantages of this method are that special equipment and procedures are required for handling pure oxygen and the high costs associated with large vacuum pumping equipment.

A key advantage of the process of the invention is that it provides an economical method to produce oxygen without the co-production of power by means of ion transport technology. This enables the process to be used over a much wider range of plant sizes (~100 tons per day to ~1000 tons per day), greatly extending the reach of this technology. In addition, it also permits the co-production of nitrogen which could make the process very attractive if both oxygen and nitrogen are desired.

The present invention permits the production of oxygen at relatively high pressure, if needed, without the need to compress a pure oxygen stream, unlike prior art processes. The ion transport module of the invention can be operated with a low pressure differential and therefore compression energy can be reduced unless the retentate gas stream is useful at high pressure. In addition, an air feed blower may be adequate for the purposes of the invention, thus eliminating the need for a more costly compressor.

The invention obviates the need for piping or handling pure oxygen at high temperatures; working with hot pure oxygen often presents serious safety hazards. Therefore, the need for special materials and procedures for handling high temperature pure oxygen is avoided by the present invention and the claimed process should achieve greater safety than typical conventional processes.

The processes of the invention can be operated over a wide variety of conditions to produce oxygen, nitrogen, or both product gas streams at low pressures or at high pressures. The processes of the invention can be driven partially by low level heat and thus can be integrated with other processes that produce heat, including processes that utilize the product oxygen in producing the heat. When operated at a high feed pressure, the invention can be integrated with gas turbines or other devices for the production of power from the high pressure product (such as nitrogen) or waste streams.

Typical ranges for operating parameters of the ion transport module are as follows:

Temperature: Typically in the 400° C. to 1000° C. range, and preferably in the 600° C. to 900° C. range.

Pressure: The purge-side pressure will be typically 1 atm to 10 atm. The feed-side pressure will be typically 1 atm to 30 atm and preferably 1.25 atm to 20 atm.

Purge Ratio (ratio of purge flow rate to feed flow rate): Typically 0.05 to 5, and preferably 0.2 to 3.

Oxygen Ion Conductivity of the Ion Transport Membrane: Typically in the 0.01–100 S/cm range (1 S=1/Ohm).

Thickness of the Ion Transport Membrane: Ion transport membrane can be employed in the form of a dense film, or a thin film supported on a porous substrate. The thickness (t) of the ion transport membrane/layer is typically less than 5000 microns, preferably t is less than 1000 microns, and most preferably t is less than 100 microns.

Configuration: The ion transport membrane elements may typically be tubular or planar.

Table I provides examples of ion transport materials suitable for oxygen separation.

TABLE 1

Material composition

1. $(La_{1-x}Sr_x)(Co_{1-y}Fe_y)\,O_{3-\delta}$ ($0 \leq x \leq 1$, $0 \leq y \leq 1$, $\delta$ from stoichiometry)
2. $SrMnO_{3-\delta}$
   $SrMn_{1-x}Co_xO_{3-\delta}$ ($0 \leq x \leq 1$, $\delta$ from stoichiometry)
   $Sr_{1-x}Na_xMnO_{3-\delta}$
3. $BaFe_{0.5}Co_{0.5}YO_3$
   $SrCeO_3$
   $YBa_2Cu_3O_{7-\beta}$ ($0 \leq \beta \leq 1$)
4. $La_{0.2}Ba_{0.8}Co_{0.8}Fe_{0.2}O_{2.6}$; $Pr_{0.2}Ba_{0.8}Co_{0.8}Fe_{0.2}O_{2.6}$
5. $A_xA'_{x'}A''_{x''}B_yB'_{y'}B''_{y''}O_{3-z}$ (x, x', x", y, y', y" all in 0–1 range; z from stoichiometry)
   where: A, A', A" = from groups 1, 2, 3 and f-block lanthanides; and
   B, B', B" = from d-block transition metals
6. (a) Co—La—Bi type: Cobalt oxide 15–75 mole %
     Lanthanum oxide 13–45 mole %
     Bismuth oxide 17–50 mole %
   (b) Co—Sr—Ce type: Cobalt oxide 15–40 mole %
     Strontium oxide 40–55 mole %
     Cerium oxide 15–40 mole %
   (c) Co—Sr—Bi type: Cobalt oxide 10–40 mole %
     Strontium oxide 5–50 mole %
     Bismuth oxide 35–70 mole %
   (d) Co—La—Ce type: Cobalt oxide 10–40 mole %
     Lanthanum oxide 10–40 mole %
     Cerium oxide 30–70 mole %
   (e) Co—La—Sr—Bi type: Cobalt oxide 15–70 mole %
     Lanthanum oxide 1–40 mole %
     Strontium oxide 1–40 mole %
     Bismuth oxide 25–50 mole %
   (f) Co—La—Sr—Ce type: Cobalt oxide 10–40 mole %
     Lanthanum oxide 1–35 mole %
     Strontium oxide 1–35 mole %
     Cerium oxide 30–70 mole %
7. $Bi_{2-x-y}M'_xM_yO_{3-\delta}$ ($0 \leq x \leq 1$, $0 \leq y \leq 1$, $\delta$ from stoichiometry)
   where: M' = Er, Y, Tm, Yb, Tb, Lu, Nd, Sm, Dy, Sr, Hf, Th, Ta, Nb, Pb, Sn, In, Ca, Sr, La and mixtures thereof; and
   M = Mn Fe, Co, Ni, Cu and mixtures thereof TABLE 1-continued Material composition 8. $BaCe_{1-x}Gd_xO_{3-x/2}$ where,
   x equals from zero to about 1.
9. One of the materials of $A_sA'_tB_uB'_vB''_wO_x$ family whose composition is disclosed in U.S. Pat. No. , 5,306,411 (Mazanec et al.) as follows:

A represents a lanthanide or Y, or a mixture thereof;
   A' represents an alkaline earth metal or a mixture thereof;
   B represents Fe;
   B' represents Cr or Ti, or a mixture thereof;
   B" represents Mn, Co, V, Ni or Cu, or a mixture thereof;
   and s, t, u, v, w, and x are numbers such that:

s/t equals from about 0.01 to about 100;
   u equals from about 0.01 to about 1;
   v equals from zero to about 1;
   w equals from zero to about 1;
   x equals a number that satisfies the valences of the A, A', B, B', B" in the formula; and $0.9 < (s + t)/(u + v + w) < 1.1$
10. One of the materials of $La_{1-x}Sr_xCu_{1-y}M_yO_{3-\delta}$ family, where:

M represents Fe or Co;
    x equals from zero to about 1;
    y equals from zero to about 1;
    δ equals a number that satisfies the valences of La, Sr, Cu, and M in the formula.
11. One of the materials of $Ce_{1-x}A_xO_{2-\delta}$ family, where:

A represents a lanthanide, Ru, or Y; or a mixture thereof;
    x equals from zero to about 1; and
    δ equals a number that satisfies the valences of Ce and A in the formula.
12. One of the materials of $Sr_{1-x}Bi_xFeO_{3-\delta}$ family, where:

A represents a lanthanide or Y, or a mixture thereof;
    x equals from zero to about 1; and
    δ equals a number that satisfies the valences of Sr and Bi in the formula.
13. One of the materials of $Sr_xFe_yCo_zO_w$ family, where:

x equals from zero to about 1;
    y equals from zero to about 1;
    z equals from zero to about 1; and
    w equals a number that satisfies the valences of Sr, Fe and Co in the formula.
14. Dual phase mixed conductors (electronic/ionic):

$(Pd)_{0.5}/(YSZ)_{0.5}$
    $(Pt)_{0.5}/(YSZ)_{0.5}$
    $(B-MgLaCrO_x)_{0.5}(YSZ)_{0.5}$
    $(In_{90\%}Pt_{10\%})_{0.6}/(YSZ)_{0.5}$
    $(In_{90\%}Pt_{10\%})_{0.5}/(YSZ)_{0.5}$
    $(In_{95\%}Pr_{2.5\%}Zr_{2.5\%})_{0.5}/(YSZ)_{0.5}$
    Any of the materials described in 1–13, to which a high temperature metallic phase (e.g., Pd, Pt, Ag, Au, Ti, Ta, W) is added.

EXAMPLES

Some of the features of the invention are illustrated by the following examples. The calculations have been made for the assumed production of 200,000 SCFH of oxygen. The process used in these examples is the same as that shown in FIG. 1 except that no optional side streams are present. For these examples, the properties of the ion transport membrane have been taken to be:

| | |
|---|---|
| Effective membrane thickness | 20 μm |
| Oxygen ion conductivity | 0.5 S/cm |
| Operating temperature (isothermal) | 800° C. |
| Substrate porosity | 40% |

Computational models have been used to determine the operating conditions of the process shown in FIG. 1, the membrane area required, and the power and thermal energy required to drive the process.

Example 1

For the Production of 200,000 SCFH of Low-Pressure Oxygen

The results of the calculations are summarized in the tables following the discussion. The operating conditions are shown in Table II-A and the calculated system requirements are given in Table II-B.

In Example 1, the feed gas stream pressure is low (20 psia) and therefore the feed blower energy is not high. Only a fraction of the oxygen in the feed gas stream is recovered as product, but this is less critical to the efficiency of the overall process since the wasted compression energy is not very great. No attempt has been made to optimize the operating conditions of Example 1 and it is only intended to be illustrative of the basic process. It should be noted that the purge gas stream is at low pressure (15 psia) enabling the use of an inexpensive, low pressure boiler-condenser. In addition, a permeate stream blower is used to raise the pressure of the permeate gas stream to 20 psia which permits a portion of steam to be condensed against boiling water. The product oxygen gas stream is recovered at 20 psia. The pressure of the recycled water is dropped from 20 psia to 15 psia before it is mixed with the make-up water stream.

The compression energy for Example 1 is seen to be almost equally divided between the feed gas stream blower and the permeate stream blower. If low level heat is available from an external source, the permeate gas stream blower can be omitted and the compression energy requirement can be reduced by 47% for Example 1.

TABLE II-A

| Gas Stream | Pressure (psia) | Temp. (°C.) | Flow (MMSCFH) | Composition (mole %) | | |
|---|---|---|---|---|---|---|
| | | | | $O_2$ | $N_2$ | $H_2O$ |
| Feed Gas Stream 1 | 14.7 | 25 | 2.81 | 21 | 79 | 0 |
| Gas Stream 5 | 20 | 800 | 2.81 | 21 | 79 | 0 |
| Retentate Gas Stream 8 | 20 | 800 | 2.61 | 15 | 85 | 0 |
| Steam Purge Stream 14 | 15 | 800 | 1.41 | 0.1 | 0 | 99.9 |
| Permeate Gas Stream 15 | 15 | 800 | 1.61 | 12.5 | 0 | 87.5 |
| Product Oxygen Gas Stream 19 | 20 | 52.5 | 0.2 | 99.5 | 0 | 0.5 |

TABLE II-B

| | | |
|---|---|---|
| Ion Transport Membrane 7 Area ($m^2$) | | 851 |
| Feed Blower 2 Energy (kW) | 966 | |
| Permeate Blower 20 Energy (kW) | 850 | |
| Total Energy (kW) | | 1,816 |
| Feed Heater 4 (million BTU/hr) | 9.9 | |
| Purge Heater 13 (million BTU/hr) | 1.1 | |
| Total Heat (million BTU/hr) | | 11 |
| Cooler condenser 17 cooling (million BTU/hr) | 9.4 | |

Example 2
For the Production of 200,000 SCFH of Intermediate-Pressure Oxygen and 820,000 SCFH of High-Pressure, 98% Purity Nitrogen Example 2 considers the production of both oxygen and nitrogen products. The operating conditions are shown in Table III-A and the calculated system requirements are given in Table III-B.

In Example 2, the energy requirement is higher than that shown in Example 1, since both products are delivered at an elevated pressure, and the heat requirement is lower. The permeate blower energy, however, is relatively low because the pressure ratio across the compressor is substantially less than that in Example 1. Thermal integration could reduce the compression energy by 13%, as well as eliminating the need for the permeate blower. As with Example 1, no attempt has been made to optimize the operating conditions.

In Example 2, a permeate stream compressor 20 is used to raise the pressure of the permeate stream 26 to 55 psia, which permits a portion of steam to be condensed against boiling water. The product oxygen gas stream 19 is recovered at 55 psia. The pressure of the recycled water stream 32 is dropped from 55 psia to 45 psia before it is mixed with the make-up water stream 34.

The tabulated operating conditions of Example 2 correspond to the steady state that would prevail when the process is up and running. For a practical process, some concern must be given to starting up the process, since it is probably undesirable to contact ion transport membrane 7 with liquid water. While start-up heating ion transport module 6 to its steady state operating temperature, some of dry retentate gas stream 8 can be used as the purge gas stream, in place of the steam which is not available at this time. The purge-permeate loop can be closed by shunting the output of purge heater 13 directly to permeate gas stream 15 and the top of superheater 12. After the steam pressure and temperature have reached the proper operating levels, the flows can be switched to correspond to that of FIG. 1. Cooling down can be accomplished by reversing this sequence, while turning off the heaters 4 and 13.

TABLE III-A

| Gas Stream | Pressure (psia) | Temp. (°C.) | Flow (MMSCFH) | Composition (mole %) | | |
|---|---|---|---|---|---|---|
| | | | | $O_2$ | $N_2$ | $H_2O$ |
| Feed Gas Stream 1 | 14.7 | 25 | 1.02 | 21 | 79 | 0 |
| Gas Stream 5 | 75 | 800 | 1.02 | 21 | 79 | 0 |
| Retentate Gas Stream 8 | 75 | 800 | 0.82 | 2 | 98 | 0 |
| Steam Purge Stream 14 | 45 | 800 | 1.53 | 0.1 | 0 | 99.9 |
| Permeate Gas Stream 15 | 45 | 800 | 1.73 | 11.5 | 0 | 88.5 |
| Product Oxygen Gas Stream 19 | 55 | 30.5 | 0.2 | 99.5 | 0 | 0.5 |

TABLE III-B

| | | |
|---|---|---|
| Ion Transport Membrane 7 Area ($m^2$) | | 865 |
| Feed Blower 2 Energy (kW) | 2,315 | |
| Permeate Blower 20 Energy (kW) | 352 | |
| Total Energy (kW) | | 2,667 |
| Feed Heater 4 (million BTU/hr) | 4.4 | |
| Purge Heater 13 (million BTU/hr) | 1.5 | |
| Total Heat (million BTU/hr) | | 5.9 |
| Condenser 17 cooling (million BTU/hr) | 8.2 | |

It is important to note that in the present configuration, the presence of steam is crucial for the separation in the ion transport module. Subsequently, steam can be easily separated from oxygen by simple condensation. For convenience, an easily separable purge gas, steam, is discussed here. Clearly, the ideas are applicable to other vapor based cycles wherein the vapor can be easily separated (for example, by condensation) from oxygen.

As mentioned previously, vacuum pumping the purge side of the ion transport module is an alternative to using a steam purge. It is, however, undesirable, since vacuum pumping requires special equipment and particularly so in these circumstances as pure oxygen at high temperature would have to be vacuum pumped, which is potentially hazardous. Even if a cooler is placed before the vacuum pump, the pressure drop through the cooler could be a major hindrance for vacuum pumping the purge side.

For the feed and purge pressures chosen in Examples 1 and 2, the given separations will not occur in the present system unless a steam purge is used. If pure oxygen is withdrawn on the purge side of the ion transport membrane, the ion transport module will become "pinched" and the required oxygen transport will not take place. For example, if pure oxygen is withdrawn at 15 psia, the minimum pressure on the feed side will have to be approximately 75 psia. If pure oxygen is withdrawn at 45 psia, the minimum and practical feed pressure will be 225 psia. For practical applications, the feed pressures will have to be even higher. This situation is clearly undesirable, particularly if nitrogen is not a product, as most of the energy expended in compressing the feed stream will be lost in the nitrogen-rich waste stream.

Although pressure-driven ion transport modules are preferred for the simplicity of their design, the ideas described here are applicable to systems utilizing either an electrically-driven or a pressure-driven oxygen separation module employing oxygen ion transport membranes. In addition, the processes of the invention can be integrated with other processes that produce low-level heat so as to reduce the energy required.

If low level waste heat is available from an external source, this heat can be used to decrease the capital and operating costs of the processes of the invention. This heat would be injected into the boiler-condenser 11, supplying all or part of the energy for making the steam. Blower 20, and its associated costs, could then be eliminated.

As shown in FIG. 1, a part of the permeate stream can be conducted through heat exchanger 3 to compensate for the unbalanced mass flow between the feed and waste streams. This modification would increase the efficiency of the heat exchanger and reduce the energy demand of the heater 4.

The product of the invention as described is typically low pressure oxygen, with or without nitrogen as a coproduct. It is also possible to make oxygen at higher pressure. All that is necessary is to operate the purge-permeate loop at an elevated pressure by increasing the steam pressure of the boiler. After condensation and separation of the liquid water, the product oxygen stream will also be at higher pressure. By this means, the product oxygen can be obtained at any reasonable pressure level that is desired.

It is apparent from the examples given above that the process of the invention is adaptable to a wide variety of operating conditions. One or both product gas streams can be produced at low or at high pressure. The operating variables, such as the purge pressure and flow rate, can be changed to accommodate changing product needs. It should be possible to rapidly make these changes and therefore to dynamically track the product needs.

If high purity (greater than 99%, more preferably greater than 99.9%) nitrogen is to be produced, it may not be practical to carry out the separation using one ion transport module stage and postpurification may have to be used. For example, oxygen and low purity nitrogen can be produced in the ion transport stage and a postpurifier may be employed to purify the nitrogen-rich retentate from the ion transport module stage. The postpurifier could be based on any of the several existing technologies: polymeric membranes, adsorbent systems (for example, PSA or TSA), a traditional deoxo system (for example, one employing $H_2$-based deoxo), or even another ion transport module.

If a second ion transport module stage is employed for postpurification, it may use a reactive purge gas, for example, methane, to purge the permeate side of the ion transport membrane such as disclosed in U.S. Pat. No. 5,837,125, which is incorporated herein by reference. Such a reactive purge gas greatly reduces the partial pressure of oxygen on the purge side of the ion transport membrane, thereby effecting an enhanced oxygen transport and requiring a much smaller ion transport membrane area than if a nonreactive purge gas were used. A reactive purge gas may also provide all or part of the heat input necessary to maintain a high operating temperature in the ion transport module stage, and may further provide heat to the feed stream such as shown in FIG. 2. It is also possible, although less desirable, to use a product purge scheme in the second ion transport module stage, whereby a part of the high purity nitrogen retentate gas stream is recycled to sweep the anode-side of the ion transport module such as disclosed in U.S. Pat. No. 5,733,435, which is a continuation of U.S. Ser. No. 08/444,354, now abandoned, both of which are incorporated herein by reference. The ion transport membrane area requirement in the product purge system is much higher than that in a reactively purged system.

As used herein the term "elemental oxygen" means any oxygen that is uncombined with any other element in the Periodic Table. While typically in diatomic form, elemental oxygen includes single oxygen atoms, triatomic ozone, and other forms uncombined with other elements.

Specific features of the invention are shown in one or more of the drawings for convenience only, as each feature may be combined with other features in accordance with the invention. In addition, various changes and modifications may be made to the examples given without departing from the spirit of the invention. Alternative embodiments will be recognized by those skilled in the art and they are intended to be included within the scope of the claims.

What is claimed is:

1. A process for producing a nitrogen product gas stream and a pressurized gas stream containing oxygen and steam from a feed gas stream which contains elemental oxygen and nitrogen, the process comprising:

(a) compressing the feed gas stream;
   (b) heating the compressed feed gas stream;
   (c) separating the heated feed gas stream using an ion transport module including an ion transport membrane having a permeate side and a retentate side into the nitrogen product gas stream on the retentate side and an oxygen-containing gas stream on the permeate side, including purging the permeate side of the ion transport membrane using a gas stream containing steam to produce the pressurized gas stream containing oxygen and steam; and
   (d) separating the pressurized gas stream containing oxygen and steam into a pressurized oxygen product gas stream saturated with water vapor and a residual water stream.

2. The process according to claim 1, wherein separation of the residual water stream includes condensing at least a portion of the water vapor contained in the gas stream containing oxygen and steam during heat exchange with another fluid stream.

3. The process according to claim 2, wherein the gas stream containing oxygen and steam undergoes heat exchange with a water stream or a water vapor stream, which becomes the gas stream containing steam used to purge the permeate side of the ion transport membrane.

4. The process according to claim 2, wherein the gas stream containing oxygen and steam is cooled to near its dew point and then compressed before the steam therein condenses, and the gas stream containing oxygen and steam undergoes heat exchange with a water stream or a water vapor stream, which becomes the gas stream containing steam.

5. The process according to claim 1, wherein the gas stream containing steam used to purge the permeate side of the ion transport membrane is at a pressure from about 30 psia to about 500 psia.

6. The process according to claim 1, wherein an oxygen product gas stream is separated from the oxygen product gas stream saturated with water vapor using a polymeric membrane drier system, a temperature swing adsorption drier system, or a pressure swing adsorption drier system.

7. The process according to claim 1, wherein the compressed feed gas stream is at a pressure between about 1 atm and about 5 atm.

8. The process according to claim 1, wherein a low level waste heat stream undergoes heat exchange with a water stream or a water vapor gas stream to generate the gas stream containing steam used to purge the permeate side of the ion transport membrane.

9. A process for producing at least a pressurized oxygen gas stream containing steam from a feed gas stream containing elemental oxygen, the process comprising:

(a) compressing the feed gas stream;

(b) heating the compressed feed gas stream using an ion transport reactor-heater;

(c) separating the heated feed gas stream using an ion transport module including an ion transport membrane having a permeate side and a retentate side into an oxygen-depleted gas stream on the retentate side and the oxygen gas stream on the permeate side, including purging the permeate side of the ion transport membrane using a gas stream containing steam at a pressure of at least 30 psia to produce the pressurized oxygen gas stream; and (d) separating the pressurized oxygen gas stream into a high pressure oxygen product gas stream saturated with water vapor and a residual water stream.

10. The process according to claim 9, wherein separation of the residual water stream includes condensing at least a portion of the water vapor contained in the pressurized oxygen gas stream during heat exchange with another fluid stream.

11. The process according to claim 10, wherein the gas stream containing steam used to purge the permeate side of the ion transport membrane is at a pressure from about 40 psia to about 500 psia.

12. The process according to claim 11, wherein the pressurized oxygen gas stream undergoes heat exchange with a water stream or a water vapor stream, which becomes the gas stream containing steam used to purge the permeate side of the ion transport membrane.

13. The process according to claim 12, wherein the pressurized oxygen gas stream is cooled to near its dew point and then compressed before the steam therein condenses, and thereafter the pressurized oxygen gas stream undergoes heat exchange with the water stream or the water vapor stream.

14. The process according to claim 11, wherein the oxygen-depleted gas stream on the retentate side is recovered as a nitrogen gas stream coproduct.

15. The process according to claim 11, wherein a low level waste heat stream undergoes heat exchange with a water stream or a water vapor stream to generate the gas stream containing steam used to purge the permeate side of the ion transport membrane.

16. A process for producing a pressurized gas stream containing oxygen and steam from a feed gas stream which contains elemental oxygen, the process comprising:

(a) compressing the feed gas stream;

(b) heating the compressed feed gas stream;

(c) heating a water stream using thermal energy from an external process to generate a gas stream containing steam;

(d) separating the heated feed gas stream using an ion transport module including an ion transport membrane having a permeate side and a retentate side into an oxygen-depleted gas stream on the retentate side and an oxygen-containing gas stream on the permeate side, including purging the permeate side of the ion transport membrane using the gas stream containing steam to produce the pressurized gas stream containing oxygen and steam; and (e) separating the pressurized gas stream containing oxygen and steam into a pressurized oxygen product gas stream saturated with water vapor and a residual water stream.

17. The process according to claim 16, further including directing the pressurized oxygen product gas stream to the external process for use therein.

\* \* \* \* \*